(No Model.)
P. F. FLEMING.
HORSE HAY RAKE.
No. 326,417. Patented Sept. 15, 1885.
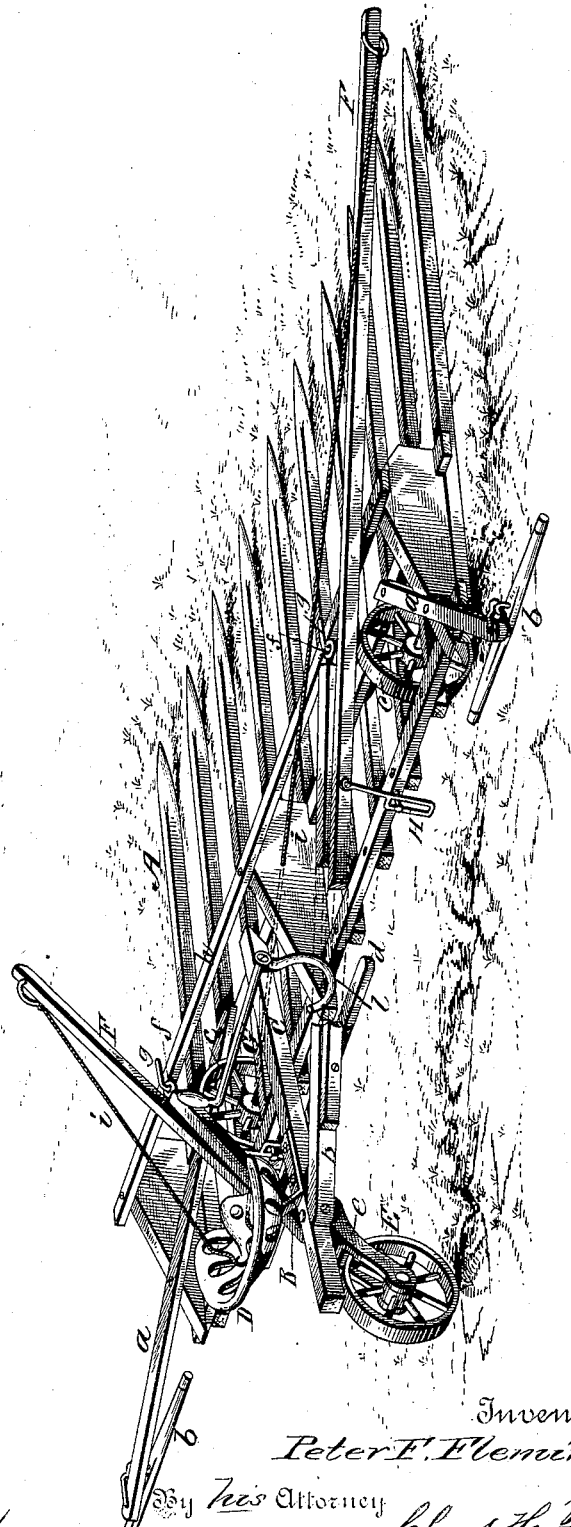
Witnesses
Inventor
Peter F. Fleming.
By his Attorney
Chas. H. Fowler

UNITED STATES PATENT OFFICE.

PETER F. FLEMING, OF HUNTSVILLE, MISSOURI.

HORSE HAY-RAKE.

SPECIFICATION forming part of Letters Patent No. 326,417, dated September 15, 1885.

Application filed September 4, 1884. (No model.)

*To all whom it may concern:*

Be it known that I, PETER F. FLEMING, a citizen of the United States, residing at Huntsville, in the county of Randolph and State of Missouri, have invented certain new and useful Improvements in Horse Hay-Rakes; and I do hereby declare that the following is a full, clear, and exact description of the same, reference being had to the annexed drawings, making a part of this specification, and to the letters and figures of reference marked thereon.

The present invention has for its object to provide a riding attachment for horse hay-rakes that can be readily connected or disconnected from the rake, as required; and it consists in the details of construction substantially as shown in the drawing, and hereinafter described and claimed.

In the accompanying drawing, which illustrates a perspective view of my invention, A represents a rake, of the ordinary construction, provided with the side beams, $a$, one on each side of the rake, to which the horses are attached by means of the single-trees $b$, said rake having the usual carrying-wheels, $c$. This rake, as shown, is one of the many forms to which my invention is applicable, and is commonly termed a "side-hitch two-horse rake," and requires two persons to properly attend to it; but with my improved attachment one attendant is all that is necessary. This riding attachment consists of a triangular frame composed of the beams B, connected to a central beam, C, and to the under side of said beams is secured a transverse brace, $d$, forming together the frame of the attachment.

To the central beam, C, is connected the driver's seat D and the swivel-hanger $e$, to which the trail-wheel E is suitably journaled so as to follow the line of draft.

The forward extremities of the beams B are provided with eyes or staples $f$, to engage with hooks $g$ on the cross-brace $h$ of the rake. This is one of many means that may be employed for coupling the riding attachment to the rake, as I do not desire to be understood as confining myself to any particular means, this coming within the ordinary judgment of the manufacturer.

To the outer sides of the beams B are pivoted the rear ends of arms F, of sufficient length to extend forward some distance over the rake A at each side thereof to form a guide for the horses and keep them off the rake-teeth, and at the same time serve as backing-poles to back the rake with when desired.

Immediately in the rear of the wheels $c$, and to the arms F, are pivoted coupling-hooks H, of any suitable form and construction, which connect with the rear end of the rake.

The forward ends of the arms F are provided with rings or other suitable means for attaching-cords $i$, extending back within reach of the driver, so that when the cords are pulled on it will cause the forward ends of the arms to be elevated, and by means of the coupling-connection of the arms with the rake it will raise the rear end thereof and depress the front ends of the rake-teeth to hug the ground while being backed from under the hay.

To one side of the central beam, C, near the front end thereof, is pivoted a lever, G, having a cam-shaped bearing portion, $l$, which comes against the rear cross-bar of the rake, so that the front of the rake can be raised or lowered at the will of the driver.

This riding attachment, as will be seen, is a device in itself independent of the rake, but readily connected thereto or disconnected at pleasure, and is applicable to any side-hitched rake.

Having now fully described my invention, what I claim as new, and desire to secure by Letters Patent, is—

A riding attachment for horse hay-rakes, consisting of a frame provided with a suitable driver's seat and trail-wheel, means, substantially as described, for detachably connecting it to the rake, a lever for raising and lowering the same having a cam-shaped bearing portion, and arms pivoted to the frame and extending forward over the rake at each side thereof, said arms provided with means for coupling them to the rear end of the rake, and at their forward ends provided with cords connected thereto and extending back within reach of the driver, substantially as and for the purpose set forth.

In testimony that I claim the above I have hereunto subscribed my name in the presence of two witnesses.

PETER F. FLEMING.

Witnesses:
 J. W. DALE,
 W. G. DUNN.